US010796000B2

(12) United States Patent
Smith et al.

(10) Patent No.: US 10,796,000 B2
(45) Date of Patent: Oct. 6, 2020

(54) BLOCKCHAIN SYSTEM WITH NUCLEOBASE SEQUENCING AS PROOF OF WORK

(71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 15/179,986

(22) Filed: Jun. 11, 2016

(65) Prior Publication Data

US 2017/0359374 A1    Dec. 14, 2017

(51) Int. Cl.
*G06F 21/00* (2013.01)
*G06F 21/57* (2013.01)
(Continued)

(52) U.S. Cl.
CPC .......... *G06F 21/57* (2013.01); *G06F 21/6245* (2013.01); *G06F 21/64* (2013.01);
(Continued)

(58) Field of Classification Search
CPC ...... G06F 21/57; G06F 21/6245; G06F 21/64; H04L 9/3236; H04L 2209/127; H04L 2209/38
See application file for complete search history.

(56) References Cited

U.S. PATENT DOCUMENTS

| 2003/0113767 A1* | 6/2003 | Rubenfield | G16B 30/00 435/6.12 |
| 2009/0088380 A1* | 4/2009 | Gaudreau | A61K 38/25 514/5.1 |

(Continued)

OTHER PUBLICATIONS

A. M. Ileri et al, "Coinanni: A Cryptocurrency with DNA Sequence Alignment as Proof-of-work", Cornell University, Computer Science>Computational Engineering, Finance, and Science. Feb. 19, 2016. https://arxiv.org/pdf/1602.03031.pdf, (Year: 2016).*

(Continued)

*Primary Examiner* — Shewaye Gelagay
*Assistant Examiner* — Michael M Lee
(74) *Attorney, Agent, or Firm* — Barnes & Thornburg LLP

(57) ABSTRACT

A sequence mining platform (SMP) comprises a processor, at least one machine-accessible storage medium responsive to the processor, and a sequence manager in the machine-accessible storage medium. The sequence manager is configured to use processing resources to determine a sequence of nucleobases in a nucleic acid. The storage medium also comprises a blockchain manager to (a) collect transaction data for one or more transactions for a blockchain which requires a proof of work (POW) for each new block; and (b) include at least some of the transaction data in a new block for the blockchain. The storage medium also comprises a sequence mining module (SMM) to use the determined sequence of nucleobases from the sequence manager to create a POW for the new block. In one embodiment, the SMM enables an entity which controls the SMP to receive transaction rewards and sequencing rewards. Other embodiments are described and claimed.

12 Claims, 7 Drawing Sheets

(51) Int. Cl.
G06F 21/62 (2013.01)
G06F 21/64 (2013.01)
H04L 9/32 (2006.01)

(52) U.S. Cl.
CPC .... *H04L 9/3236* (2013.01); *G06F 2221/2149* (2013.01); *H04L 2209/127* (2013.01); *H04L 2209/38* (2013.01)

(56) References Cited

U.S. PATENT DOCUMENTS

| | | | | |
|---|---|---|---|---|
| 2016/0070859 | A1* | 3/2016 | Ignatenko | G16B 50/40 707/693 |
| 2016/0072800 | A1* | 3/2016 | Soon-Shiong | H04L 63/0861 726/7 |
| 2016/0085916 | A1 | 3/2016 | Smith | |
| 2017/0243212 | A1* | 8/2017 | Castinado | H04L 9/3236 |
| 2018/0068060 | A1* | 3/2018 | Ceze | G11C 13/02 |
| 2018/0148778 | A1* | 5/2018 | Mercer | C12Q 1/6869 |

OTHER PUBLICATIONS

Bitcoin Wiki, "Help:FAQ", retrieved from <https://en.bitcoin.it/wiki/Help:FAQ> on Apr. 27, 2016, 15 Pages.

Bitcoin Wiki, "Genesis Block", retrieved from <https://en.bitcoin.it/wiki/Genesis_block> on May 10, 2016, 3 Pages.

Bitcoin Wiki, "Proof or Work", retrieved from <https://en.bitcoin.it/wiki/Proof_of_work> on Apr. 27, 2016, 3 Pages.

Bitcoin, "Bitcoin Developer Guide", retrieved from <https://bitcoin.org/en/developer-guide#block-chain-overview> on May 10, 2016, 55 Pages.

Bitcoin, "How Does Bitcoin Work", retrieved from <https://bitcoin.org/en/how-it-works> on May 16, 2016, 2 Pages.

Merriam Webster, "Genome", retrieved from <http://www.merriam-webster.com/dictionary/genome> on Apr. 27, 2016, 7 Pages.

Wikipedia, "Sequence Alignment", retrieved from <https://en.wikipedia.org/wiki/Sequence_alignment> on Jun. 3, 2016, 13 Pages.

Haemse, "Single Molecule Real Time Sequencing—Pacific Biosciences" video at <https://www.youtube.com/watch?v=v8p4ph2MAvI>, Published on Oct. 21, 2011, 1 Page.

Illumina Inc, "Illumina Sequencing Technology", video at <https://www.youtube.com/watch?v=womKfikWIxM>, Published on Oct. 23, 2013, 1 Page.

Martin Laurence, "Oxford Nanopore Technologies", video at <https://www.youtube.com/watch?v=3UHw22hBpAk>, Published on Apr. 9, 2014, 1 Page.

Oxford Nanopore Technologies, "MinION: A Portable Analysis Device", video at <https://www.youtube.com/watch?v=BNz880V52rQ>, Published on Jul. 9, 2015, 1 Page.

Thermo Fisher Scientific, "Ion Torrent™ next-gen sequencing technology", video at <https://www.youtube.com/watch?v=WYBzbxlfuKs>, Published on May 19, 2014, 1 Page.

Wikipedia, "Allele", retrieved from <https://en.wikipedia.org/wiki/Allele> on Apr. 27, 2016, 4 Pages.

Wikipedia, "Bitcoin Network", retrieved from <https://en.wikipedia.org/wiki/Bitcoin_network> on May 10, 2016, 12 Pages.

Wikipedia, "Block Chain (Database)", retrieved from <https://en.wikipedia.org/wiki/Block_chain_(database)> on Apr. 27, 2016, 6 Pages.

Wikipedia, "DNA Sequencer", retrieved from <https://en.wikipedia.org/wiki/DNA_sequencer> on May 17, 2016, 7 Pages.

Wikipedia, "DNA sequencing", retrieved from <https://en.wikipedia.org/wiki/DNA_sequencing> on Apr. 27, 2016, 25 Pages.

Wikipedia, "Gene", retrieved from <https://en.wikipedia.org/wiki/Gene> on Apr. 27, 2016, 22 Pages.

Wikipedia, "Nucleotide", retrieved from <https://en.wikipedia.org/wiki/Nucleotide> on Jun. 3, 2016, 8 Pages.

* cited by examiner

US 10,796,000 B2

BLOCKCHAIN SYSTEM WITH NUCLEOBASE SEQUENCING AS PROOF OF WORK

TECHNICAL FIELD

This disclosure pertains in general to security for electronic data, and in particular to methods and apparatuses for mining blockchains.

BACKGROUND

A blockchain is a database consisting of two or more block records that are linked together and that adhere to a predetermined standard or protocol. For brevity, block records may be referred to as "blocks." Each block is a data structure that contains a link to the previous block, a payload, and a proof of work (POW). However, a link to a previous block may be omitted from the initial block (which may also be referred to as the "genesis block"). According to a typical blockchain protocol, a block also includes a hash value for the payload, possibly along with other hash values or other types of data. Data items such as the link to the previous block, the POW, and the hash of the payload may be collected into a block header. The payload may include one or more transaction records. For brevity, transaction records may be referred to as "transactions."

Bitcoin, for instance, is a popular blockchain implementation or protocol in which each block has a header with a hash for the previous block. The headers thus link the blocks into a chain. Each Bitcoin block also has a payload. That payload typically documents one or more financial transactions. Accordingly, a blockchain may be used as a distributed ledger of transactions.

A blockchain may be considered a distributed database because multiple different data processing systems may obtain copies of the blockchain, and multiple different data processing systems may update the blockchain. For instance, a blockchain may be made available to the public via the Internet, and data processing systems may update the blockchain by creating new blocks and publishing those blocks via the Internet. A data processing system that adds blocks to a blockchain (or that attempts to do so) may be referred to as a "miner."

One of the most important technical challenges associated with blockchains involves security. In particular, since a blockchain can be updated by many different data processing systems, it is important to implement security measures which prevent attackers from making improper updates to the blockchain, to prevent the attackers from corrupting or hijacking the blockchain.

In order to prevent miners from making improper updates to a blockchain, the protocol for the blockchain typically requires each new block to include a POW which provides reliable evidence that a significant amount of processing resources (such as time) was used during creation of that new block. For instance, according to the Bitcoin implementation, to create a valid new block, the miner must use processing resources to find a nonce value that, when hashed along with the rest of the block header, results in a hash value which has a predetermined number of leading zeros (in other words, a hash value that is numerically less than a predetermined value). Consequently, miners typically cycle through a process of (a) generating a candidate nonce, (b) inserting that candidate nonce into the header of the new block, (c) hashing the header (with the candidate nonce), and (d) determining whether the resulting hash is numerically less than the predetermined value, until the miner finds a suitable nonce. Thus, according to Bitcoin, the nonce serves as the POW, and significant processing resources are typically used to generate that nonce.

The present disclosure introduces methods and apparatuses for accomplishing additional useful work in conjunction with blockchain mining. In particular, as described in greater detail below, the present disclosure introduces methods and apparatuses for using data processing power of a data processing system to determine a sequence of nucleobases in a nucleic acid, and for then using the determined sequence of nucleobases as the basis for a POW for a new block for a blockchain.

DESCRIPTION OF EMBODIMENTS

Figure 1:
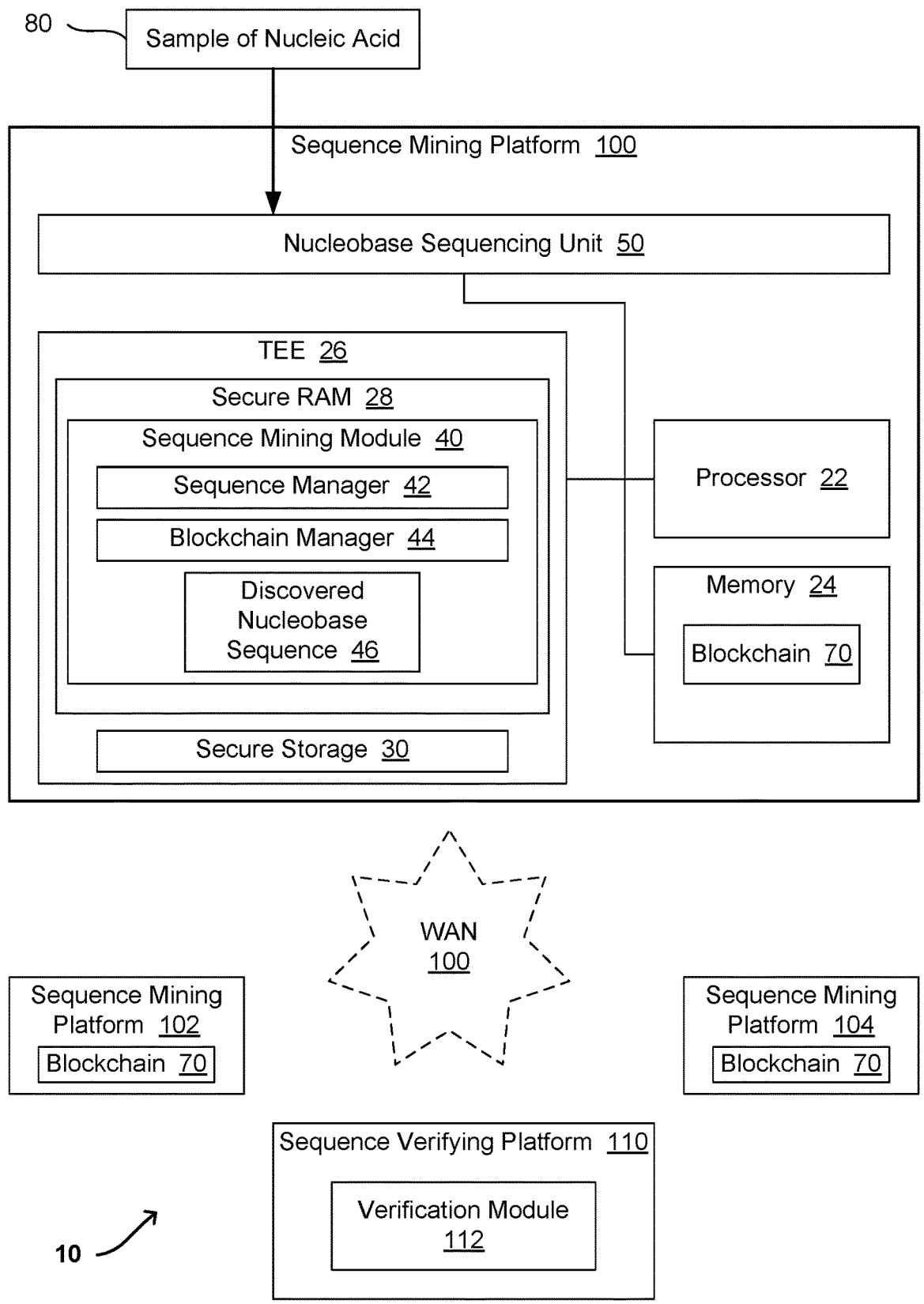
FIG. 1 is a block diagram of an example embodiment of a blockchain system involving multipurpose POW operations.

As indicated above, a blockchain is a database or data structure with linked blocks that adhere to a predetermined protocol. A blockchain may contain transactions and blocks. Transactions may be created by nodes or participants to describe financial transactions or to provide other types of information. In addition, each transaction record may be timestamped and digitally signed by the device which created it. After a device creates a transaction record, the device may send it to other block chain peers via the Internet, the "cloud," or any other suitable connection. A miner may then create a new block record containing that transaction record, possibly along with other transaction records. In addition, the miner may include a hash of (some or all of) the prior block in the new block, thus linking the blocks together into a chain. Blocks may confirm when and in what sequence transactions are recorded in the blockchain.

Also, a miner will typically use the POW in (at least) the last block of the blockchain to verify the blockchain before creating a new block for that blockchain. A miner may also verify the transactions in (at least) the last block of the blockchain, to further verify the blockchain, before creating a new block for that blockchain. A miner may also verify the transactions for the new block before including them in the payload of the new block.

The operations associated with generating new blocks and updating a blockchain may be referred to in general as "mining." For instance, to modify or update a blockchain, a miner may create a new block for the end of the blockchain and then publish or broadcast that new block.

A blockchain may include all valid block that have ever been created. Accordingly, a blockchain may contain a set of data records that is continuously growing, with each record referring to at least one previous record on the set. A blockchain may thus be hardened against tampering and revision. The miners and other nodes which cooperate to maintain and build a blockchain according to a predetermined blockchain protocol may be referred to as a "blockchain system." Each node in a blockchain system may include a copy of the entire blockchain or a portion of the blockchain.

Typically, several miners will be competing for the privilege of adding the next block to a blockchain. And as indicated above, as an important security measure, the blockchain protocol may require each new block to include a POW which provides reliable evidence that a significant amount of processing resources were used during creation of that new block. For example, at least one conventional blockchain protocol requires each miner to expend significant processing resources (such as time, energy, and processor cycles) generating nonces and performing hashing operations, until the miner finds a valid nonce to serve as the POW.

In general, a POW is a piece of data that takes a significant amount of time or "work" to produce. For instance, as indicated above, Bitcoin uses a process with nonces and corresponding hash results that are more or less random, with each nonce having a low probability of success, so that each miner executes a great many trials and errors, on average, before generating a valid POW for a new block. According to the Bitcoin protocol, when a miner sends a new block to the network, the other miners verify the new block, including the POW, to decide whether the new block should be accepted as part of the blockchain. If the block passes verification, the miners accept the block as part of the blockchain. And if any of those miners was also working on a new block, the miner generally discards some or all of the work associated with the in-process block, because the next new block will need to be linked with the block that was just accepted, and the next new block should not contain any transactions that are already contained in the block that was just accepted.

The Bitcoin protocol may make it impractical for an attacker or a group of attackers to corrupt or hijack the blockchain. However, according to that protocol, the processing resources that are used to find valid nonces do not serve any other useful purpose.

The present disclosure, by contrast, involves a blockchain protocol which, when implemented in a blockchain system, enables miners to accomplish additional useful work while generating proofs of work (POWs) for new blocks. In particular, as described in greater detail below, miners determine sequences of nucleobases when generating POWs. And since a miner accomplishes additional useful work while generating a POW, the POW may be referred to as a "multipurpose POW," and the work to create the POW may be referred to as "multipurpose POW operations."

FIG. 1 is a block diagram of an example embodiment of a blockchain system 10 involving multipurpose POW operations. In particular, in the embodiment of FIG. 1, blockchain system 10 is a distributed data processing system that includes multiple sequence mining platforms (SMPs) 100, 102, and 104 and a sequence verifying platform (SVP) 110. Those platforms may communicate with each other via a wide area network (WAN) 100 such as the Internet, for instance. Other embodiments may feature additional SVPs, a smaller or greater number of SMPs, other types of networks, or other suitable variations. For instance, as indicated below, one embodiment involves at least 30 SMPs. Other embodiments may include hundreds or thousands of SMPs. For purposes of this disclosure, an SVP may be referred to simply as a "verifying platform."

In the embodiment of FIG. 1, each SMP includes a copy of a blockchain 70. And as described in greater detail below, when each SMP in blockchain system 10 creates a new block for blockchain 70, that SMP (a) uses processing resources to determine a sequence of nucleobases in a nucleic acid and then (b) uses the determined sequence of nucleobases as the basis for the POW for the new block.

The nucleic acid may be deoxyribonucleic acid (DNA) or ribonucleic acid (RNA), for example. Also, as explained by Wikipedia:

A chromosome is "a packaged and organized structure containing . . . DNA of a living organism."

Human DNA (for example) includes 46 chromosomes, which are classified into 23 pairs.

A gene is "a locus (or region) of DNA that encodes a functional RNA or protein product, and is the molecular unit of heredity."

An allele is "one of a number of alternative forms of the same gene or same genetic locus."

A locus (plural loci), is "the specific location or position of a gene, DNA sequence, on a chromosome."

A nucleobase is a "nitrogen-containing biological compound[ ] . . . found linked to a sugar" within a nucleoside. A nucleobase may also be referred to simply as a "base."

The abilities of bases "to form base pairs and to stack upon one another lead directly to the helical structure of DNA and RNA."

The "primary, or canonical, nucleobases are cytosine (DNA and RNA), guanine (DNA and RNA), adenine (DNA and RNA), thymine (DNA) and uracil (RNA), abbreviated as C, G, A, T, and U, respectively."

A nucleoside is "the compound formed when a nucleobase forms a glycosidic bond with the 1' anomeric carbon of a ribose or deoxyribose."

A nucleotide is "a nucleoside with one or more phosphate groups attached at the 5' carbon." Also, a nucleotide is "made of a nucleobase (also termed a nitrogenous base), a five-carbon sugar (either ribose or 2-deoxyribose, depending on if it is RNA or DNA), and one or, depending on the definition, more than one phosphate groups."

A nucleic acid sequence is "a succession of letters that indicate the order of nucleotides within a DNA . . . or RNA . . . molecule. By convention, sequences are usually presented from the 5' end to the 3' end. For DNA, the sense strand is used. Because nucleic acids are normally linear (unbranched) polymers, specifying the sequence is equivalent to defining the covalent structure of the entire molecule. For this reason, the nucleic acid sequence is also termed the primary structure." Also, if "one strand of the double-stranded DNA is considered the sense strand, then the other strand, considered the antisense strand, will have the complementary sequence to the sense strand."

Wikipedia also explains as follows: "Each chromosome carries many genes; humans' estimated "haploid" protein coding genes are 20,000-25,000, on the 23 different chromosomes. . . . The ordered list of loci known for a particular genome is called a gene map. Gene mapping is the process of determining the locus for a particular biological trait." And according to the Chromosomes Fact Sheet made available on the Internet by the National Human Genome Research Institute, chromosomes are "thread-like structures located inside the nucleus of animal and plant cells. Each chromosome is made of protein and a single molecule of [DNA]. Passed from parents to offspring, DNA contains the specific instructions that make each type of living creature unique."

Accordingly, for purposes of this disclosure, a sequence of nucleotides at a particular location within a chromosome (or other nucleic acid) may be referred to as a "gene," and the process of discovering, determining, or "reading" a sequence of nucleobases in a chromosome (or other nucleic acid) may be referred to in general as "DNA sequencing" or "gene sequencing." Similarly, a nucleic acid sequence may be referenced using terms such as a "discovered nucleobase sequence" (DNS), a "nucleobase sequence," a "base sequence," a "determined sequence," a "read sequence," a "read," etc.

As illustrated within SMP 100 in FIG. 1, each SMP may include processing resources such as one or more processors 22 in communication with components such as main memory 24, a trusted execution environment (TEE) 26, and a nucleobase sequencing unit (NSU) 50.

TEE 26 may provide an isolated execution environment, providing security features such as isolated execution, integrity of trusted applications, and confidentiality of data used by those applications. Further details on the features of a TEE may be found in the article by the GlobalPlatform assocation entitled "GlobalPlatform made simple guide: Trusted Execution Environment (TEE) Guide" ("The TEE Guide"). For instance, the TEE Guide (which is currently available at www.globalplatform.org/mediaguidetee.asp) explains as follows:

The TEE is a secure area of the main processor in a [device]. It ensures that sensitive data is stored, processed and protected in an isolated, trusted environment. The TEE's ability to offer isolated safe execution of authorized security software, known as 'trusted applications', enables it to provide end-to-end security by enforcing protected execution of authenticated code, confidentiality, authenticity, privacy, system integrity and data access rights. Comparative to other security environments on the device, the TEE also offers high processing speeds and a large amount of accessible memory.

The TEE offers a level of protection against attacks that have been generated in the Rich [operating system (OS)] environment. It assists in the control of access rights and houses sensitive applications, which need to be isolated from the Rich OS. For example, the TEE is the ideal environment for content providers offering a video for a limited period of time, as premium content (e.g. HD video) must be secured so that it cannot be shared for free.

In addition, with regard to the security infrastructure of a data processing system or device, the TEE Guide describes a framework with the following three environments. One of those environments is the TEE. The other two are described as follows:

Rich OS: An environment created for versatility and richness where device applications . . . are executed. It is open to third party download after the device is manufactured. Security is a concern here but is secondary to other issues.

[Secure Element (SE)]: The SE is a secure component which comprises autonomous, tamper-resistant hardware within which secure applications and their confidential cryptographic data (e.g. key management) are stored and executed. It allows high levels of security, but limited functionality, and can work in tandem with the TEE. The SE is used for hosting proximity payment applications or official electronic signatures where the highest level of security is required. The TEE can be used to filter access to applications stored directly on the SE to act as a buffer for Malware attacks.

In the embodiment of FIG. 1, TEE 26 is implemented as an isolated processing core that also contains protected storage, along with control logic that ensures the integrity of software executing in the TEE. The protected storage may include volatile memory such as secure random access memory (RAM) 28 (which may be implemented as static RAM (SRAM), for instance) and nonvolatile or persistent memory such as secure storage 30. TEE 26 protects the data in the protected storage from being accessed by any software or other components outside of TEE 26, including software operating at the operating system (OS) level. TEE 26 may also prevent software in TEE 26 from affecting components outside of TEE 26. TEE 26 may be implemented as a service processor or a security coprocessor, for instance. In addition, TEE 26 may serve as a trusted platform module (TPM). Accordingly, SMP 100 may store sensitive data or "secrets" (e.g., keys and credentials) in the protected storage of TEE 26. For instance, SMP 100 may store a signing key and other device credentials for SMP 100 in secure storage 30.

In other embodiments, a main processor may use specialized instructions (a) to create a TEE that uses main memory and (b) to utilize that TEE. For instance, to create and utilize a TEE, a device may use the technology provided by Intel Corporation under the name or trademark "Intel Software Guard Extensions" or "Intel SGX," or the technology provided by ARM Ltd. under the name or trademark "ARM TrustZone."

With regard to FIG. 1, each SMP may receive a sample 80 of nucleic acid, and the SMP may then use its NSU to analyze the sample, to determine the sequence of nucleobases for some or all of the sample, as described in greater detail below.

An NSU may also be referred to as a "genome sequencing unit." An NSU may include a sequencer for determining the order of some or all of the bases in a sample of nucleic acid such as DNA. The sequencer may be implemented as an array of digital sequencing engines, for example. The NSU may then report the discovered sequence as output (e.g., as a list, as an array, or as a text string). Different embodiments may use different types of sequencers. For instance, the sequencer in an NSU may use electrophoresis, optical technologies, or any other suitable approach to discover the order of the bases in the sample. For instance, an optical sequencer in an NSU may analyze light signals originating from fluorochromes attached to nucleotides. An NSU may also include a splitter for dividing a sample into smaller pieces or segments before some or all of those segments are processed by the sequencer.

SMP 100 (and the other SMPs) may also include a sequence mining module (SMM) 40 that manages some or all of the operations associated with reading base sequences and mining bocks for the blockchain. SMM 40 may execute within TEE 26. SMM 40 may include a sequence manager 42, and SMM 40 may use sequence manager 42 to control NSU 50. And when sequence manager 42 receives a DNS 46 from NSU 50, sequence manager may store DNS 46 in secure RAM 28.

SMM 40 may also include a blockchain manager 44, and SMM 40 may use blockchain manager 44 to collect transactions and generate a new block for blockchain 70. And as described in greater detail below, SMM 40 and/or blockchain manager 44 may use some or all of DNS 46 as the basis for the POW for the new block.

Verifying platform 110 may include the same or similar components as SMP 100. Alternatively, verifying platform 110 may lack components such as an NSU, and verifying platform 110 may include other components, such as a verification module 112. Verifying platform 110 may be controlled by a research institution, for example.

Figure 2:
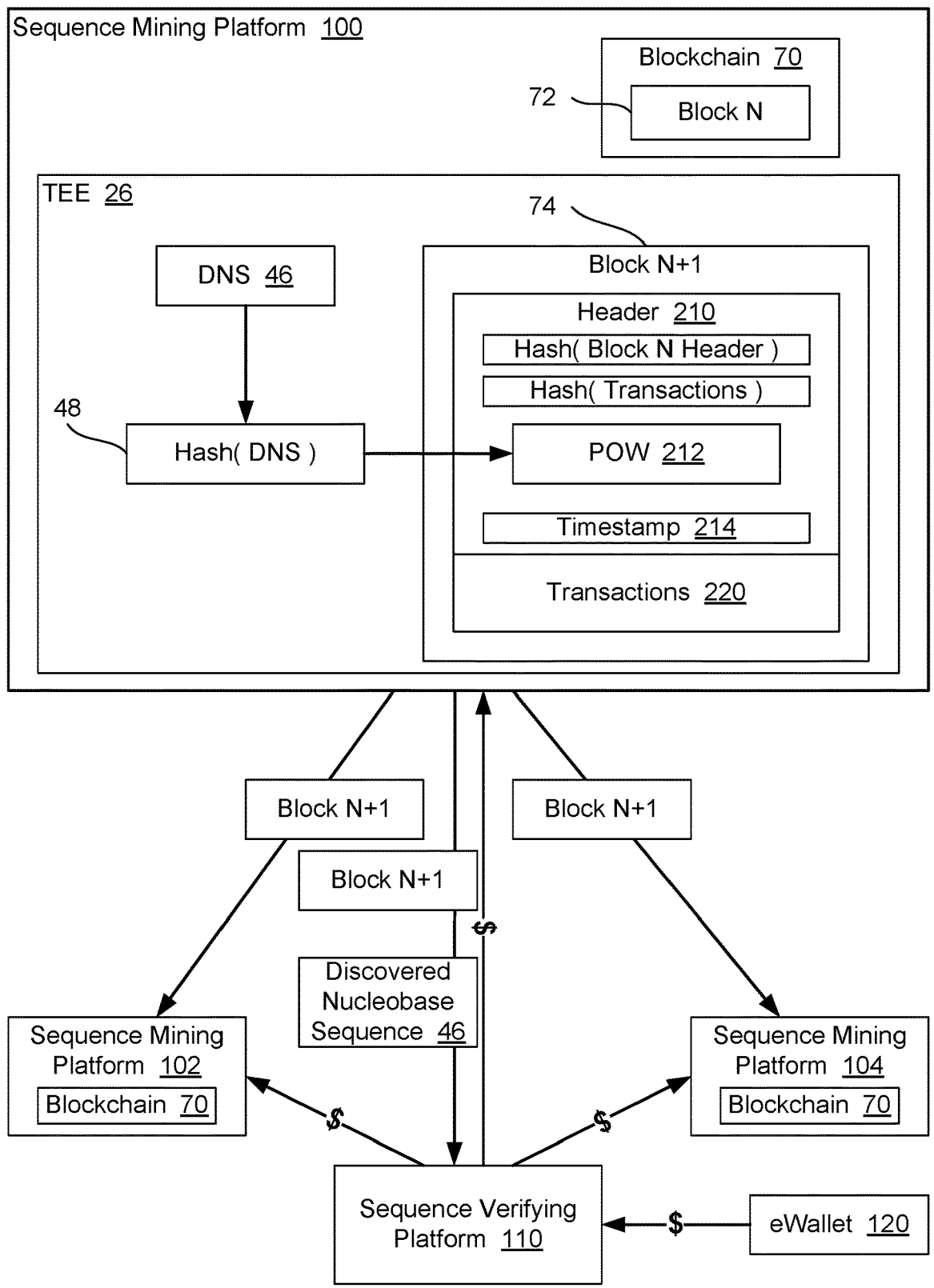
FIG. 2 is a block diagram of the blockchain system of FIG. 1 with more details for a new block.

FIG. 2 is a block diagram of blockchain system 10 with more details pertaining to a new block for blockchain 70. As illustrated, blockchain 70 includes an existing block 72, which is the last block that has been accepted as valid. That last block could be the genesis block. Or, more typically, the last block will be the last valid block that was added to blockchain 70 by a miner. Accordingly, blockchain 70 could also include many other, older blocks. For ease of understanding, however, only the last block 72 is shown in FIG. 2. Also, for purposes of this disclosure, the last block (or most current block) that has been accepted into blockchain 70 may be referred to as "block N."

As described in greater detail below, blockchain manager 44 may collect transactions 220 and include them as payload for a new block 74 for blockchain 70. New block 74 may also be referred to as "block N+1." Blockchain manager 44 may also create a header 210 for new block 74. Header 210 may include various items, such as a hash of the header of the previous block (i.e., block N), a hash of the transactions 220 in the payload, a POW 212, and a timestamp 214.

And to generate POW 212 for new block 74, blockchain manager 44 may compute a cryptographic hash of DNS 46. Blockchain manager 44 may then use the hash 48 of DNS 46 as POW 212. Blockchain manager 44 may then transmit new block 74 (i.e., block N+1) to the other nodes in blockchain system 10, such as SMPs 102 and 104 and SVP 110. As described in greater detail below, the other miners may then verify the sequence by sequencing a segment that includes the same locations or finding a previously sequenced value which, when hashed, matches the POW value.

In addition, SMM 40 may send a copy of DNS 46 to verifying platform 110. As described in greater detail below, verifying platform 110 may then use verification module 112 to verify DNS 46.

Miners may receive compensation for creating new blocks. That compensation may take the form of transaction fees, based on the transactions in the new blocks. Transaction fees may also be referred to as "transaction rewards." In addition, that compensation may take the form of sequencing rewards, based on items such DNSs and/or POWs in the new blocks. For instance, when an individual creates a transaction for blockchain 70, the individual may configure the transaction to include a payment to benefit DNA research. For example, the individual may use a point-of-sale (POS) terminal to create a transaction, and the individual may configure the transaction to include such a payment by selecting an option, presented by the POS terminal, to contribute to DNA research. That payment may name the research institution that controls verifying platform 110 as the payee, for instance. In addition or alternatively, verification module 112 in verifying platform 110 may track which SMPs have corroborated a DNS in a new block, and verification module 112 may cause those SMPs to receive a reward for that corroboration. That reward may include some or all of the payments to benefit DNA research included in some or all of the transactions in the new block. Consequently, the reward may originate from the so-called blockchain wallet or eWallet 120 of each individual who elected to contribute to benefit DNA research. When a block includes transactions with such contributions, the research institution may keep some of those contributed funds to support further research and analysis, and the research institution may forward the rest of the contributed funds to the SMPs who created and corroborated the block with those transactions. Accordingly, FIG. 2 uses dollar signs to show contributed funds flowing from eWallet 120 to verifying platform 110, and shared rewards flowing from verifying platform 110 to SMPs 100, 102, and 104. For purposes of this disclosure, a reward may be said to flow to an SMP if that reward flows to an entity associated with the SMP. For instance, if an individual controls the SMP, rewards for the SMP may actually flow to an eWallet that is owned or controlled by that individual.

Figure 3:
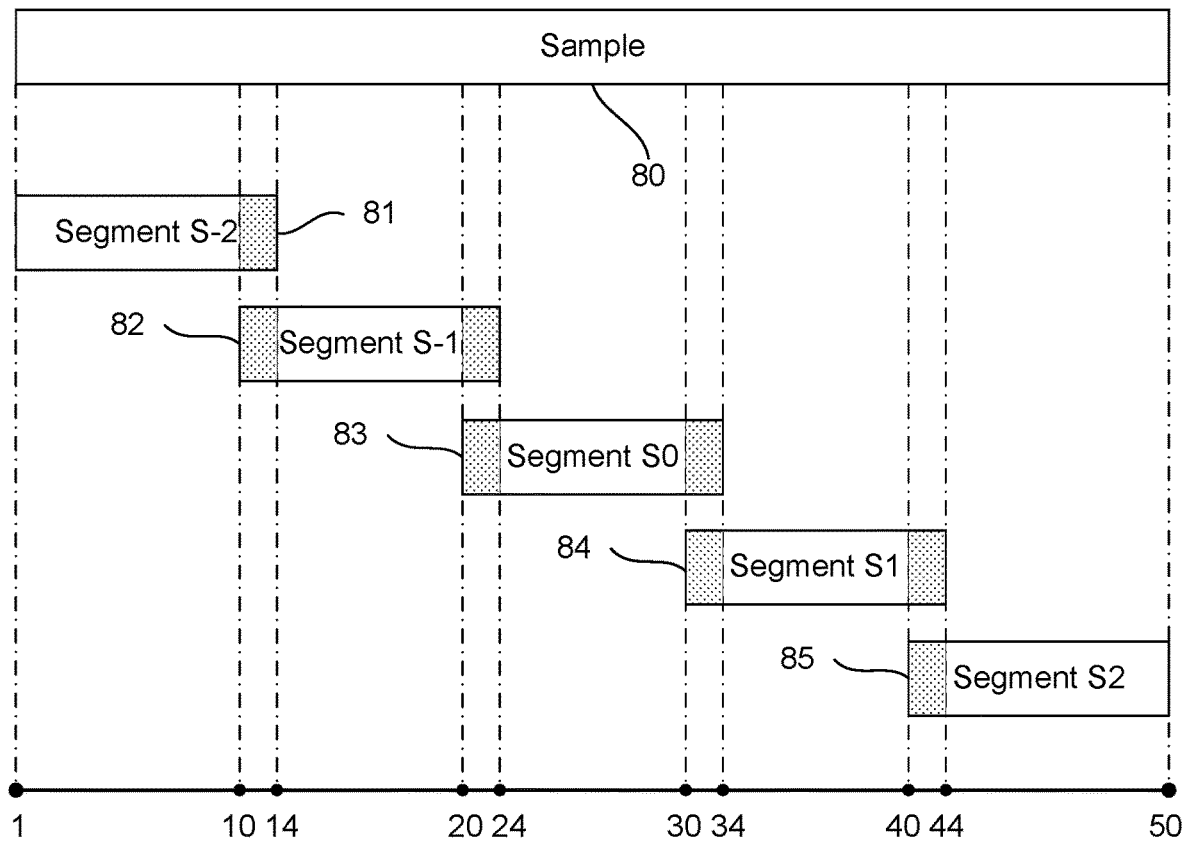
FIG. 3 is a block diagram illustrating a number of related nucleobase sequences within a sample of nucleic acid.

FIG. 3 is a block diagram illustrating a number of related nucleobase sequences within a sample of nucleic acid, such as sample 80. In particular, FIG. 3 illustrates sample 80 along with various segments of sample 80. Those segments may be referred to as segments 81-85, or as Segment S-2, Segment S-1, Segment S0, Segment S1, and Segment S2, respectively.

In this example scenario, sample 80 is a complete strand from a predetermined chromosome from a particular organism, and the objective is to see how much of a complete, unbroken strand can be sequenced by miners. For purposes of illustration, sample 80 is shown with only fifty nucleobase locations, but in practice samples may contain fewer or more locations. For instance, human chromosome 1 may contain over 200,000,000 base pairs. The research institution may already know the sequence for one part or segment of the sample (e.g., Segment S0), and the research institution may share that information with the SMPs, to enable the SMPs to use that predetermined sequence as a starting point begin their sequencing operations. The SMPs may then determine sequences for other segments of the sample, as described in greater detail below.

In other scenarios, the sample may be a predetermined piece of a chromosome strand. Alternatively, the sample may contain multiple chromosomes, pieces from multiple chromosomes, or any other suitable form of nucleic acid. The research institution may instruct the SMPs as to which parts of the sample are to be read, based on a predetermined evaluation by the research institution as to the potential benefit of knowing the sequence for those parts of the sample. The sequence manager in each SMP may then use the NSU to read the specified segment or segments of the sample. For instance, the sequence manager may use the splitter to extract the relevant material from the sample, and the sequence manager may then use the sequencer to read that material.

In one scenario, the research institution that controls verifying platform 110 sends an identical sample 80 to each SMP. In addition, verification module 112 in verifying platform 110 may send each SMP instructions to read the base sequences for the specified segments of sample 80. Verification module 112 may also instruct the SMPs to start with segment S0. Verification module 112 may use any suitable approach to specify the segments to be read and the starting segment. For instance, verification module 112 may use consecutive numbers or addresses or indexes to identify the location for each base, starting from a specified end of sample 80, and verification module 112 may identify each segment using the indexes for the first location and the last location within that segment. For example, in the example of FIG. 3, verification module 112 may assign positions 20-34 to segment S0, etc. In addition, verification module 112 may provide the SMPs with the read sequence for segment S0.

Figure 4:
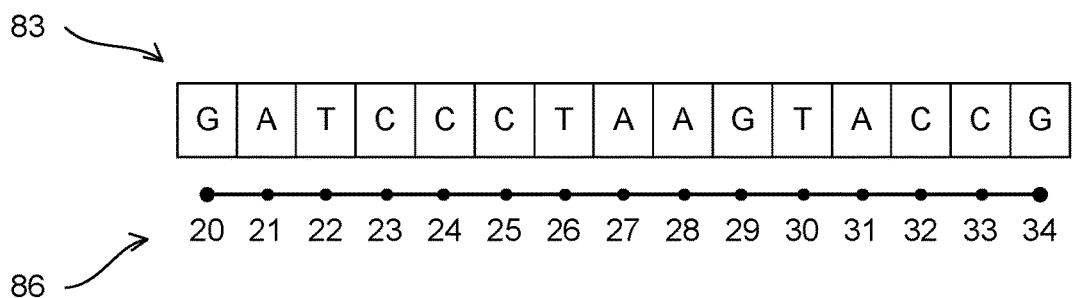
FIG. 4 is a block diagram illustrating an example discovered nucleobase sequence.

FIG. 4 is a block diagram illustrating an example discovered nucleobase sequence for segment S0. Verification module 112 may already know that segment S0 contains the illustrated sequence of nucleobases, and verification module 112 may provide the SMPs with that read sequence for segment S0. Alternatively, verification module 112 may provide the SMPs with the locations for segment S0, and the SMPs may then discover the illustrated sequence of nucleobases for those locations. In FIG. 4, DNS index 86 illustrates that the SMPs (and verifying platform 110) associate each base in the DNS with a corresponding location or index. For instance, location 20 contains a G, location 21 contains an A, etc.

In addition, as illustrated with dotted fill in FIG. 3, adjacent segments may have overlapping sections. As part of the process for identifying a genome for the organism from which sample 80 was obtained, the research institution may specify segment S0 as the starting point for reading sample 80, as indicated above. In response, the SMPs may construct a longer, more complete sequence of identified bases by piecing together discovered segments. As part of that process, the SMPs may compare overlapping sequences for adjacent segments until matching sequences are found. SMP 100 may use SMM 40, blockchain manager 44, and NSU 50 to do that analysis.

For ease of understanding, FIG. 3 shows only five segments, but many more segments may be read in other embodiment or scenarios. Similarly, for purposes of illustration, FIG. 3 shows segments that span 14 locations, but segments may span less than 14 or more than 14 locations in other embodiments or scenarios. Similarly, a sample may span more than 50 or less than 50 locations. For instance, as indicated above, a sample may include millions of locations to be read.

In some embodiments, the blockchain protocol may require the SMPs to use NSUs which are configured or hardwired to intentionally introduce a relatively small number of errors into the determined base sequences. Those errors may be hidden or secret from the SMPs. For purposes of this disclosure, an error that is intentionally introduced by an NSU but not known to other components of the SMP may be referred to as a "secret error." In one embodiment, an error generating algorithm in the NSU inserts secret errors into random or substantially random locations within the sequence. In another embodiment, all NSUs use an error generating algorithm that inserts certain base results in certain positions, where the inserted base results differ from the actual bases in those positions. However, the SMPs may not be privy to any details of the error generating algorithm or how it works. On the other hand, the verifying platform may be privy to the details of the error generating algorithm. The verification module in the verifying platform may therefore be able to correct the secret errors in a DNS when the verifying platform receives the DNS from an SMP. Alternatively, the verification module may correct secret errors based on consensus results from a large number of verified or trusted SMPs. Additional information about at least one example process for verifying SMPs is provided below.

The secret errors may help verifying platforms to detect cheating via collusion. For instance, a threshold of colluders might share a copy of an incorrect read sequence, and the colluders might try to pass off that incorrect sequence as the real sequence—in effect asserting that, because the colluders have a majority, their version of the sequence is to be believed. If the verifying platform determines that the DNSs in the blocks from the colluders lack the secret errors, the verifying platform may reject those blocks. In addition or alternatively, if the SMPs are supposed to be using an error generating algorithm that produces random errors, the verifying platform may reject two or more blocks from different miners that contain the same errors, since it may be presumed that those miners shared results, rather than independently performing the work. It would be statistically improbable for a threshold of miners to observe the same random errors.

Also, at least for purposes of determining whether segments overlap, an SMP may be configured to determine that a portion of one segment matches or aligns with a portion of another segment, even though the results reported by the NSU for one or more positions within the two portions being compared are not identical. SMPs may use any suitable approach to determine sequence alignment, and additional information regarding sequence alignment may be found on the Internet at en.wikipedia.org/wiki/Sequence_alignment. For instance, in one embodiment, if a predetermined minimum number X of consecutive bases in two segments match, the sequence manager in the SMP may conclude that the segments overlap for a span of Y positions (with X<Y), even though the overlap may include one or more bases that do not match, possibly due to secret errors. Thus, secret errors may be discounted or disregarded if a long sequence of matches including overlap can be found. In addition or alternatively, the sequence manager in the SMP may conclude that the first and second segments overlap at N positions in response to a determination that N bases at the end of a first segment match the same number of bases at the beginning of a second segment with an accuracy of M %, where M is a predetermined accuracy threshold.

Figure 5:
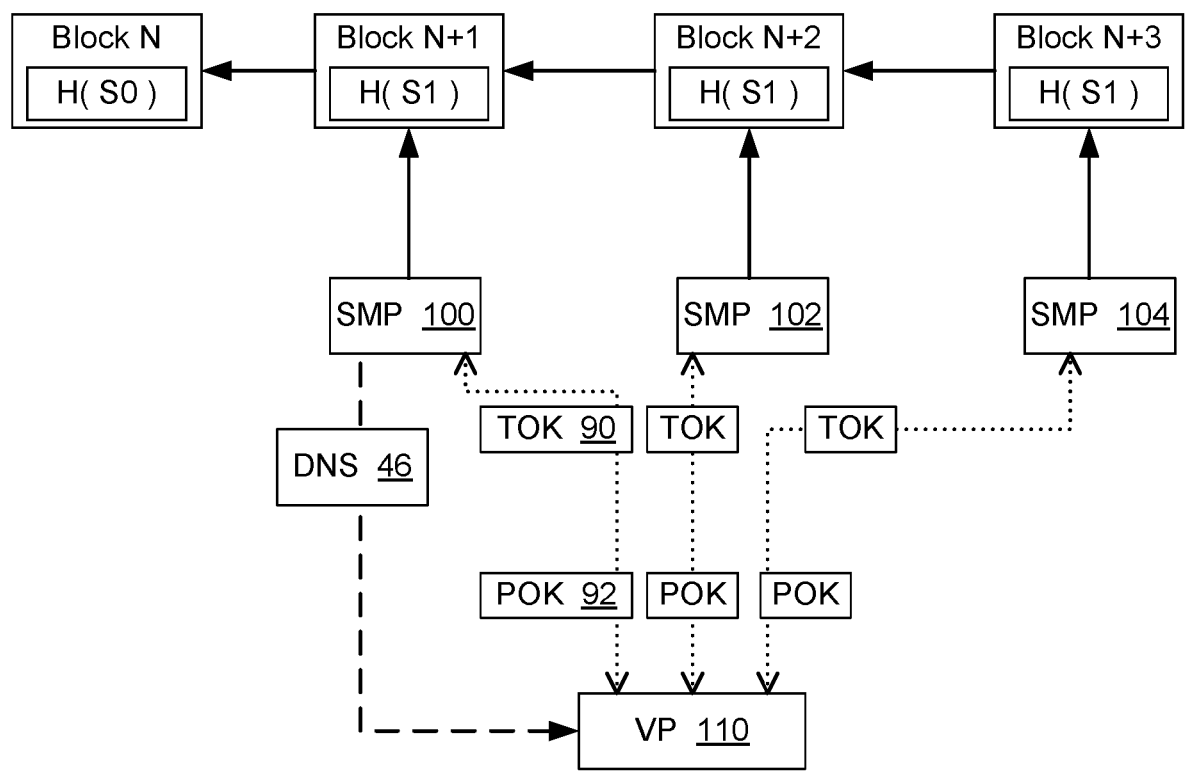
FIG. 5 is a block diagram illustrating an example sequence of blocks in a blockchain.

FIG. 5 is a block diagram illustrating an example sequence of blocks in a blockchain. In addition, FIG. 5 illustrates certain aspects of verification by verifying platform 110. For example, as described in greater detail below, FIG. 5 shows verifying platform 110 receiving DNS 46 and corroborating that sequence with other mining nodes.

The sequence of blocks in FIG. 5 includes a block N, followed by a block N+1, followed by a block N+2, followed by a block N+3. Block N may be the most current block 72 from blockchain 70, for instance. As indicated by the arrows pointing left, each block is linked to its previous or "parent" block (e.g., by a hash of the header of that previous block). In addition, each block includes a hash of a DNS, to serve as the POW for that block. In particular, block N has a hash of the DNS for segment S0—represented as "H(S0)"—and each of the other blocks has a hash of the DNS for segment S1. And as shown by the solid arrows pointing up, block N+1 was generated and broadcast by SMP 100, block N+2 was generated and broadcast by SMP 102, and block N+3 was generated and broadcast by SMP 104.

Also, as shown by the dashed arrow, after SMP 100 broadcasts block N+1, SMP 100 sends DNS 46 to verifying platform 110. However, in at least one embodiment, SMP 100 encrypts DNS 46 before sending it to verifying platform 110. When verifying platform 110 receives DNS 46 from SMP 100, verification module 112 may decrypt DNS 46. In addition, verification module 112 may respond to receiving DNS 46 by sending a test of knowledge (TOK) 90 to SMP 100. Then, in response to receiving TOK 90, SMP 100 may send verifying platform 110 a proof of knowledge (POK) 92. As described in greater detail below, verification module 112 may use POK 92 to verify that SMP 100 actually did the work to generate DNS 46.

Likewise, SMP 102 and SMP 104 may also send their DNSs (not shown) to verifying platform 110, and in response verification module 112 may send TOKs to SMP 102 and SMP 104. The SMPs may then send POKs to verifying platform 110, to prove that they did the work to generate their respective DNSs.

Each TOK may ask the SMP to provide proof that the SMP knows which nucleobases reside at specified locations within sample 80. For instance, the TOK may require the SMP to hash the nucleobases at positions 1 through 10 of segment S1 and return that hash value as the POK. Alternatively, the TOK may specify a more complex or comprehensive set of positions. For instance, the TOK may require the SMP to hash positions from more than one segment, or the TOK may require the SMP to hash the entire sample. The positions being tested by the TOK may be referred to as the testing path. Verification module 112 may randomly select some or all parts of the testing path.

In one embodiment, the TOK from verifying platform 110 takes the following form:

Request("PX", n1)

where "PX" identifies the testing path (e.g., the positions being tested), and n1 represents a segment index to identify segment being tested. And the corresponding POK from the SMP takes the following form:

Response($\{PX_{m2}, n1\}K_v$)

where the curly brackets represent encryption; $K_v$ represents the verifier's key (which may be the verifier's public Rivest-Shamir-Adleman (RSA) key or a pair-wise symmetric key negotiated between the miner and the verifier, for example); and $PX_{m2}$ represents the POK provided by the SMP (e.g., a hash of the values on the testing path). The values on the testing path (or a hash of those values) may be referred to as the "proof series" or "Pseries." All of the values in the sample (or a hash of those values) may be referred to as the "proof total" or "Ptotal." In one embodiment, the SMP uses one hash tree to specify the Pseries and another hash tree to specify the Ptotal. Once the verifying platform has received those hash trees from a threshold of miners, the verifying platform may use those hash trees to efficiently find the secret errors in each of the samples.

For instance, when verification module 112 has found a threshold of corroborating miners for the same segment (e.g., segment S1), verification module 112 may declare that segment valid. Consequently, verification module 112 may then cause the corroborating miners to be paid a reward. However, if a miner produces a result that doesn't match the majority of other corroborators, or if the miner fails the TOK, verification module 112 selects a next miner as the threshold corroborator, and this process is repeated until a threshold quorum is reached. In addition, verification module 112 may log these transactions, and those logs may subsequently be analyzed to rank and rate the performance of the different SMPs.

In one scenario, a rogue miner simply copies the POW value (e.g., H(S1)) from another miner. The rogue miner has not done the work to determine the sequence itself (e.g., S1). Consequently, even if the rogue miner lies about generating the correct result, the rogue miner will fail the TOK.

Figure 6:
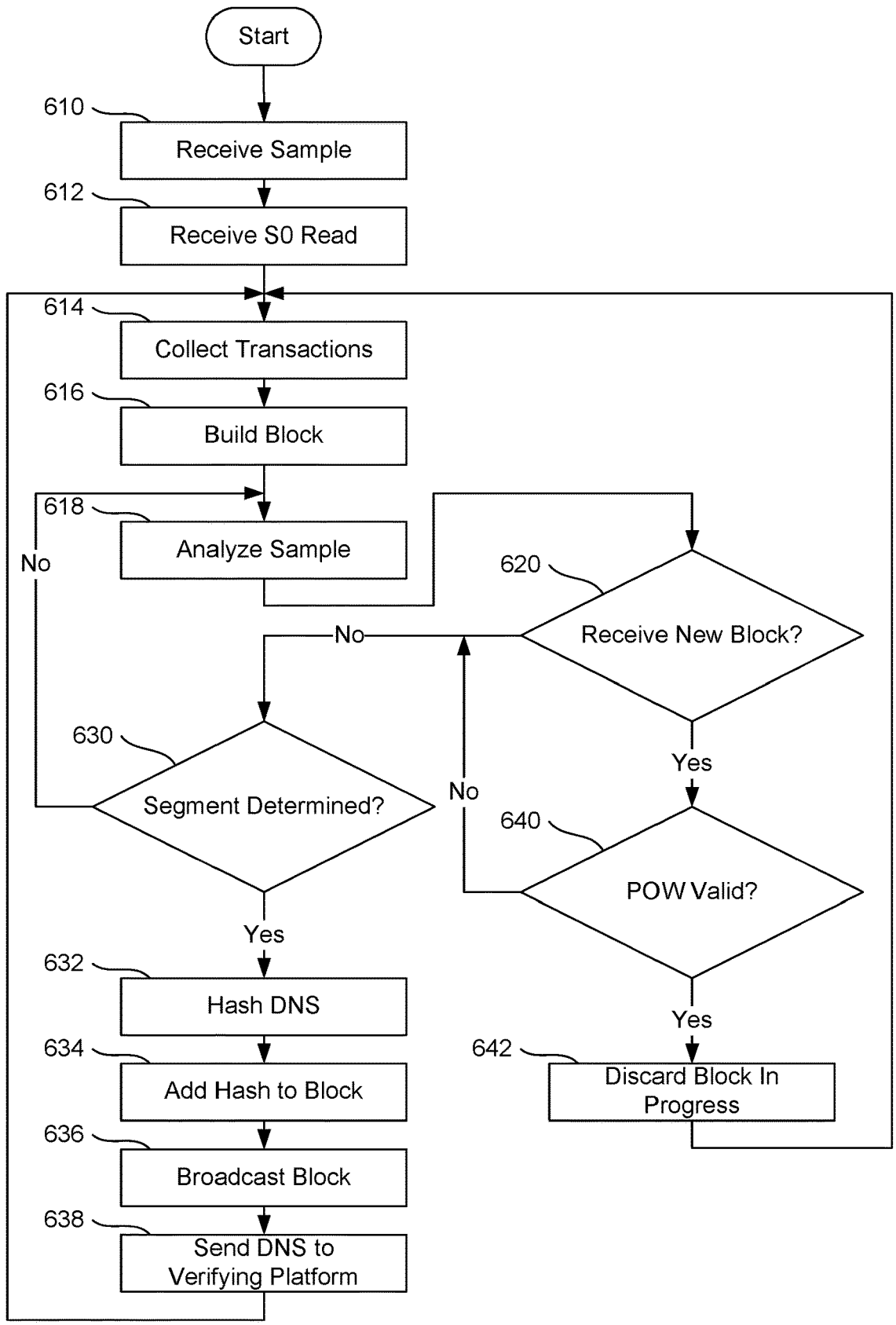
FIG. 6 is a flowchart of an example process for creating blocks.

FIG. 6 is a flowchart of an example process for creating blocks, presented from the perspective of SMP 100, for purposes of illustration. That process begins at block 610 with SMP 100 receiving sample 80 from the research institution associated with verifying platform 110. At block 612, SMP 100 receives the nucleobase sequence for segment S0 from the research institution (e.g., via verifying platform 110). For example, SMM 40 may receive the sequence illustrated in FIG. 4.

As shown at block 614, SMM 40 may then use blockchain manager 44 to start collecting and verifying transactions to be added to a new block for blockchain 70. As shown at block 616, blockchain manager 44 then starts building a new block (e.g., block N+1), to include a header that links back to the last block in the chain (e.g., block N), along with a payload containing some or all of the collected transactions. In addition, as shown at block 618, SMM 40 may use sequence manager 42 to analyze sample 80, to read the bases for one or more segments.

As shown at block 620, SMM 40 may then determine whether SMP 100 has received a new block for blockchain 70. For instance, another miner may have finished reading a segment and may have used that segment to create a POW for a new block. The other miner may have then broadcasted its new block to the other miners in blockchain system 10. If SMP 100 receives such a block before SMP 100 has finished creating block N+1, SMM 40 may then determine whether the received block has a valid POW, as shown at block 640. For instance, if SMP 100 has already read the segment that was used for the POW for the received block, SMP 100 may hash that segment and determine whether that hash matches the POW in the received block. SMP may use a segment identifier from the header of the new block to determine which segment formed the basis of the POW.

As shown at block 642, if SMM 40 determines that the POW is valid, SMM 40 may discard or modify the block SMM 40 was working on, since the block that SMM 40 has just corroborated should now be considered the last current block in the blockchain, and the next block should link back to the block that was just corroborated, rather than block N. Also, the block that was corroborated may include transactions that SMM 40 was going to include in its new block, but those transactions should not be repeated. Accordingly, the process of FIG. 6 may flow from block 642 back up to block 614, with blockchain manager 44 collecting additional transactions, building a new block with those transactions, etc.

However, referring again to block 620, if SMP 100 has not received a new block, the process may pass to block 630, with SMM 40 determining whether sequence manager 42 has finished reading a complete segment, thereby generating a result such as DNS 46. If a complete segment has been discovered, SMM 40 may hash that segment, as shown at block 632. As shown at block 634, SMM 40 may then add that hash to the header of the new block. SMM 40 may also update the header of the block with a segment identifier to identify the segment that forms the basis of the POW. For instance, the sequenced segment can be identified in terms of an offset and a length from the beginning of the sample or from the beginning or end a reference segment, such as segment S0.

As shown at block 636, SMM 40 may then broadcast the new block to the other nodes in blockchain system 10, such as SMP 102, SMP 204, and verifying platform 110. As shown at block 638, SMM 40 may then send the determined segment to verifying platform 110. And as indicated above, SMM 40 may encrypt that data before sending it to verifying platform 110.

The process of FIG. 6 may then return to block 614, with SMP 100 collecting more transactions, reading more segments from sample 80, generating more new blocks, and corroborating blocks from other miners, as described above.

In one scenario, many different miners may be involved in adding blocks that are each based on the same segment.

And if the blockchain protocol does not involve random, secret errors, those blocks may end up using the same POW. For instance, as reflected in FIG. 5, SMP 100 may create block N+1 using a POW based on segment S1, and SMP 102 may create block N+2 using (what turns out to be) the same POW. And SMP 104 may create block N+3 with that same POW. However, as indicated above, the verifying platform may also use a TOK to make sure that each of the SMPs knows the sequence behind the POW. Consequently, if a miner simply copies the POW, that miner will be unable to respond correctly to a TOK.

And if the blockchain protocol includes a corroboration threshold of N, before the verifying platform accepts a DNS for a particular segment, the verifying platform may need to wait until (at least) N blocks have been added to the blockchain by (at least) N different miners, possibly with different payloads of transactions, but with the POWs for all of those blocks based on that segment. The verification module 112 in verifying platform 110 may also require at least N of those miners to pass the TOK. Accordingly, if a particular sample includes 4 segments to be read, and the corroboration threshold is 30, at least 120 blocks might be needed to complete the process of reading and verifying that sample. Miners may also work in parallel on different aspects of a sample or study. For example, different segments may be given to different sets of participating miners (e.g., segment 1 to nodes 1 through N, segment 2 to nodes n+1 through M, etc.).

In addition, the process of sequencing may require miners to piece together many overlapping sequences, to removing duplicate sequences, and to retry many variations in order to get longer sequences. If a miner has filled a block with transactions, the miner then may simply use its longest sequence as a segment. The miner may then hash that segment into a POW for the block and then broadcast that block to the other nodes.

If a receiving miner has already sequenced the positions in that segment, the receiving miner may accept the first miner's block and work on completing a longer sequence. Or the receiving miner may reject the block (e.g., if the receiving miner concludes that the POW is invalid). Or the receiving miner may simply wait for another block. If the receiving miner fills the next block with transaction and is ready to commit, the receiving miner may then use the longest sequence discovered by the receiving miner. If that sequence is a subset of the first miner's sequence, then first miner may accept the block as being valid since the first miner already knows the subset. If the sequence is a superset, the first miner may wait to complete the sequence then accept the block as correct.

A miner may identify the segment that forms the basis of the POW for a new block (i.e., the "new segment") by specifying an offset from the segment in the most current block (i.e., the "last segment"), along with a length for the segment that forms the basis of the POW for the new block, for instance. The miner might do so even if the most current block has not yet been formally validated or accepted by the verifying platform. The miner might do so, for instance, if the last segment has not yet been bridged to the starting sequence, but the miner determines that the new segment and the last segment are part of the same gene. Consequently, there can be multiple "starting points" for different segments. And a segment that has not yet been bridged to a known valid segment (such as starting segment S0) may be referred to as a "tentative segment." However, the verifying platform or research institution may not accept a segment starting point that has been specified by a miner until that starting point has been bridged or linked a known starting sequence, such as segment S0. Nevertheless, in the meantime, miners are free to work on tentative segments (e.g., on a fork from the blockchain) until the bridge sequence is found that ties the tentative segments back to the main line of the blockchain.

Figure 7:
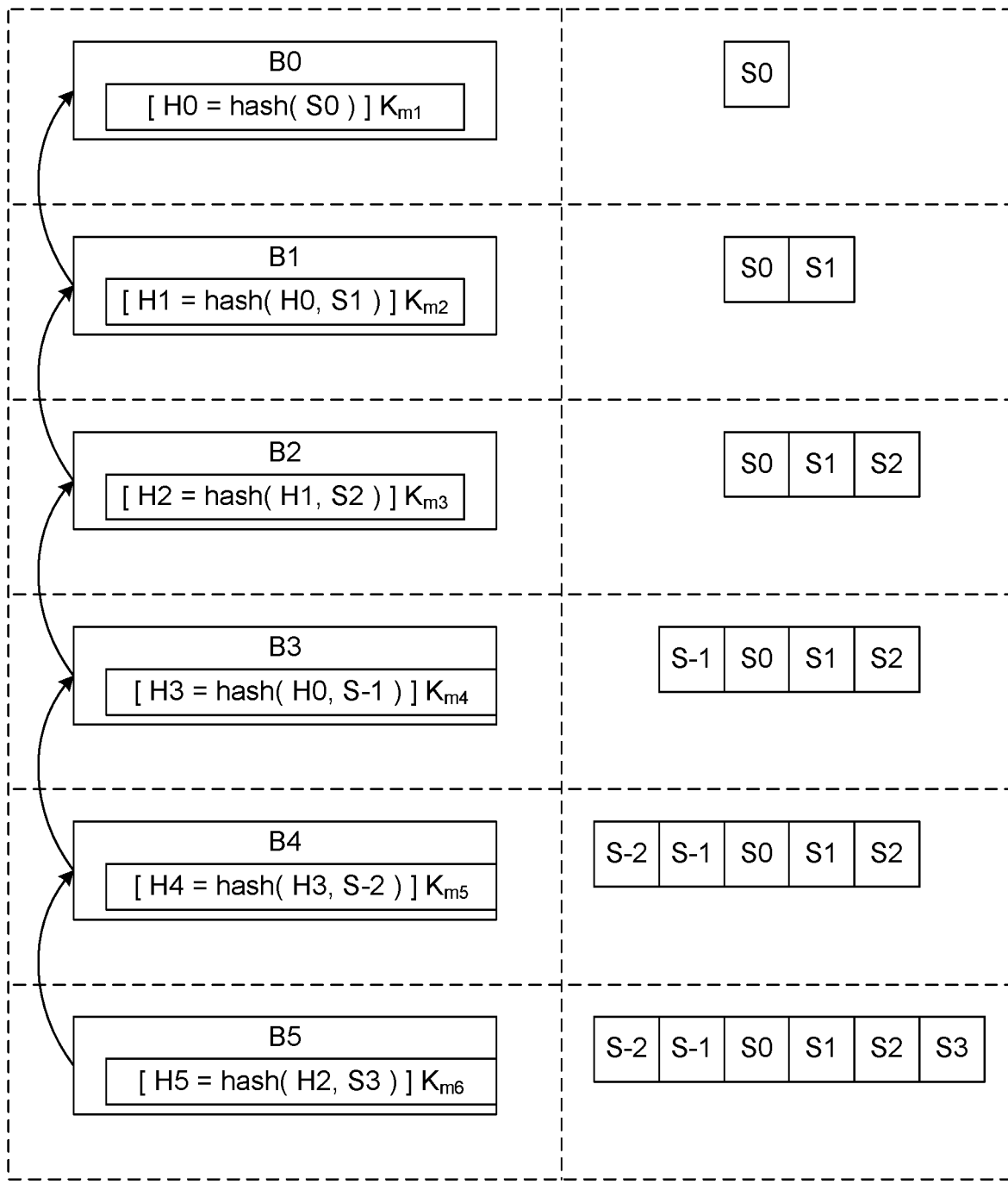
FIG. 7 is a block diagram illustrating an example sequence of updates to a blockchain.

FIG. 7 is a block diagram illustrating a sequence of updates to a blockchain according to an example scenario. In the illustrated scenario, miners (e.g., SMP 100, SMP 102, SMP 104, and other SMPs) append discovered sequences for different segments from a sample to the front or back of an initial segment from the sample. This process may continue until a complete strand has been discovered.

The right side of FIG. 7 illustrates how knowledge of the segments from the strand grows as the miners analyze the sample, and the left side illustrates a corresponding sequence of blocks, as the miners generate those blocks and add them to the blockchain, in response to reading the segments. FIG. 7 starts on the right, with miner M1 reading the sequence for segment S0 from the sample. Miner M1 then creates block B0 and uses the hash of the read sequence for segment S0 as the POW for that block. As illustrated in FIG. 7, the hash of the read sequence for segment S0 may be referred to as H0. In addition, as illustrated with square brackets, miner M1 uses a signing key "$K_{m1}$" to digitally sign H0, and miner M1 includes that digital signature in block B0. In addition, miner M1 is including transactions in the block, miner M1 may include those transactions in the hash that is being signed by the miner. Miner M1 may then broadcast block B0 to the other nodes in the blockchain system.

As illustrated in the second row of FIG. 7, another miner "M2" then discovers the sequence for segment S1, and determines that segment S2 is adjacent to segment S1 (e.g., by detecting overlap between segments S1 and S2, as indicated above). Miner M2 then creates block B1 and uses the hash of the read sequence for segment S1 as the POW for that block. In addition, miner M2 hashes the result of the previous block hash (H0) along with the new DNS value (i.e., the read sequence for segment S1). The result of that hash may be referred to as H1. Miner M2 also uses a signing key "$K_{m2}$" to digitally sign H1, and miner M2 includes that digital signature in block B1. As indicated above, the miner may also include any transactions for the block in the hash that is being signed by the miner. Miner M2 may then broadcast block B1 to the other nodes in the blockchain system. Subsequently, miners M3, M4, M5, and M6 may use the same kind of approach to create blocks B2 through B5. Once block B5 has been broadcast, the blockchain system will reflect knowledge of segments S-2 through S3, which in the example scenario constitutes a complete strand. The miners may also send their DNS s to the verifying platform, as indicated above. And as described in greater detail below, the verifying platform may validate those DNSs. Consequently, after the miners have read the last segment, verifying platform may know the complete strand, as well.

Once a data processing system knows the sequence for the complete strand, that data processing system can use the ledger entries in the blockchain to verify that sequence without publicly disclosing the sequence. Also, miners may be required to encrypt sequence information sent to verifiers. In addition, verifiers may test the TEE of each miner that reports sequence information to the verifier, as an additional security precaution to prevent collusion among miners. However, the primary enforcement mechanism to prevent collusion may be provided by the blockchain protocol, which requires the blockchain to follow the specified design.

Due to that protocol, if a community of miners colludes to supply an incorrect sequence, the blocks from the colluders will cause a branch or fork of the blockchain. That fork will compete with the fork that is built by the honest miners who get a different result. When the number of honest miners exceeds the colluding miners, the invalid blocks and colluding miners may be discovered, which would put the mining enterprise of the colluders at risk. Self-interest will motivate honest behavior by the majority of nodes.

Figure 8:
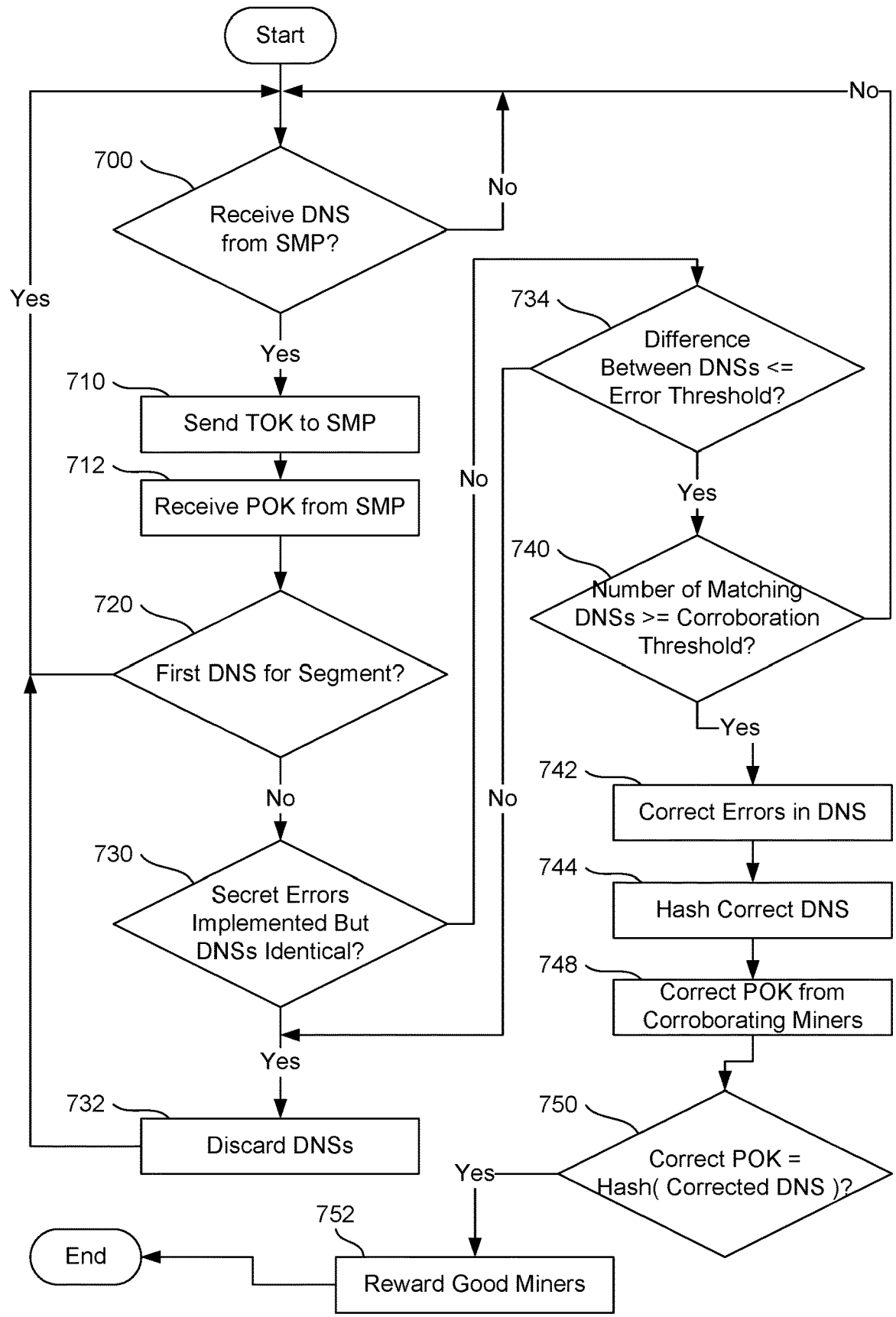
FIG. 8 is a flowchart of an example process for verifying discovered nucleobase sequences.

FIG. 8 is a flowchart of an example process for verifying discovered nucleobase sequences. In one scenario, that process is executed by verification module 112 in verifying platform 110. The process may start at block 700 with verifying platform 110 receiving a DNS for a segment of a sample from an SMP. In response, as shown at block 710, verification module 112 may send a TOK to that SMP, as indicated above. The SMP may respond with a POK, as shown at block 712. Verification module 112 may then determine whether that DNS is the first example of the DNS for that segment to have been received by verifying platform 110. If it is the first example of the DNS for that segment, the process may return to block 700 with verification module 112 waiting to receiving additional DNSs for that segment.

As shown at block 730, if it is not the first example of the DNS for a segment, verification module 112 may then determine whether, according to the relevant blockchain protocol, the DNS is supposed to have secret errors, and whether any of the received samples lack such errors. For example, if two SMPs have sent identical DNSs, verification module 112 may conclude that at least one of those samples was generated or copied without using an NSU that introduces secret errors. Consequently, as shown at block 732, verification module 112 may discard all DNSs that do not have random, secret errors, compared to some or all other DNSs for the same segment. The process may then return to block 700, with verifying platform 110 receiving additional DNSs.

However, if verification module 112 determines that none of the DNSs lack secret errors (e.g., by deciding that none of the DNSs for the same segment are identical), the process may pass from block 730 to block 734, with verification module 112 determining whether any two DNSs differ by more than a predetermined error threshold. The error threshold may be based on the number of differences that would be expected, due to secret errors. For instance, if each DNS is supposed to have one secret error, but two DNSs differ by more than two secret errors, verification module 112 may conclude that the difference between those DNS is greater than a predetermined error threshold of two. Verification module 112 may then discard any DNSs with too many errors, as shown at block 732.

However, if all of the DNSs have the proper number of secret errors, the process may pass from block 734 to block 740, with verification module 112 determining whether verifying platform 110 has received a threshold number of matching and valid DNSs for a segment. For instance, for a corroboration threshold of thirty, verification module 112 may require valid DNSs for the same segment from thirty different SMPs. If the predetermined corroboration threshold has not been met, the process may return to block 700, with verifying platform 110 receiving additional DNSs, as described above.

As shown at block 742, once the corroboration threshold has been met, verification module 112 may then correct the secret errors in each DNS, to result in a final correct DNS. As shown at block 744, verification module 112 may then hash the correct DNS. As shown at block 748, verification module 112 may then generate a corrected POK for each SMP that provided a valid DNS for the corroborated segment. As shown at block 750, verification module 112 may then determine whether each corrected POK matches the hash of the corrected DNS for the corroborated segment. In addition or alternatively, as indicated above, the TOK and POK may involve predetermined portions of a sample, possibly including information from more than one segment. If a POK involves multiple segments, verification module 112 may wait until all of those segments have been corroborated before correcting the miner's version of that POK and determining whether that corrected version is correct.

As shown at block 752, verification module 112 may then provide a sequencing reward for each SMP who provided both (a) a valid DNS and (b) a POK which, when corrected, matches the hash of the corrected DNS. The process of FIG. 8 may then end. Or it may be repeated for additional segments from the sample, or for additional samples.

Thus, by adopting a protocol that requires miners to use NSUs which inject secret errors into DNS s, the blockchain system provides additional mitigation against colluding miners. In one embodiment, miners will not be able to modify the NSU hardware or software in a way that manipulates the random error injection. If miner M1 (for instance) shares its copy of the strand or segment with miners M2 through M30, they will all have the same random error(s), and they will be detected. In addition, if miners M1 and M2 collude to detect each other's injected error(s), they would need to legitimately do the sequencing work for at least two of three colluding miners. If the NSU is configured to inject 2 errors, then there would need to be 4+1 collaborators. If the NSUs inject 3 errors then there would need to be 8+1 collaborators, and so on. If 5 errors were injected, there would need to be 32+1 collaborators. At least one research institution requires at least thirty collaborators to agree on a DNS before that DNS is accepted. A blockchain system that injects 5 errors would satisfy such a requirement. If there are also naturally occurring errors, the verifier could easily detect these as well.

In one scenario, the first 30 collaborators get paid the reward. In such a scenario, there would be no incentive to have more than 30 colluders, and it would be less work to do honest mining. Furthermore, in one embodiment, the TEE verifies that the NSU has not been modified before building any blocks for the blockchain. The protocol may impose a separation of duties between the TEE and the NSU, so that if the TEE is modified by a colluder, the colluder must also modify the NSU.

As indicated above, blocks are accepted as part of the blockchain only if they have a valid POW. A block with an invalid POW may cause a fork in the blockchain. However, as indicated above, a miner may test the validity of the POW in a parent block before creating a new child block to be linked with that parent block. So the miner may discard a parent block with an invalid POW. In addition, a miner may always start with the longest chain. So a fork that does not get added to (such as a fork with an invalid POW) should be disregarded, in favor of a fork that has at least one more block that the block with the invalid POW.

As has been described, this disclosure presents a technical protocol for operating a blockchain, and that protocol enables miners to offset potential side effects of energy use with nucleobase sequencing results that can have broad potential benefits, possibly leading to improved prevention of cancer and other diseases, improved understanding of biological ecosystems, improved tracking of populations and pathology, etc. A blockchain system which facilitates such social benefits may be considered preferable to alternative blockchain systems which do not facilitate such benefits.

According to the described protocol, nucleobase sequencing operations may be distributed, and results may be corrected for possible sequencing mistakes based on a predetermined threshold of corroborated results. The blockchain may involve peer-to-peer confirmation of new blocks, with miners sharing new blocks with one or more peers. Miners may then receive transaction rewards in response to verification of the new block by multiple peers. In addition, miners may share determined sequences of nucleobases with an interested party in exchange for sequencing rewards. According to the disclosed blockchain system, public ledger transactions may be processed in a distributed manner. Furthermore, the work required to compromise the public ledger may be computationally infeasible. For instance, an attacker might need to solve the difficult problem of DNA sequencing in such a way that a majority of observers are convinced an incorrect sequence from the attacker is correct.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Any suitable operating environment and programming language (or combination of operating environments and programming languages) may be used to implement components described herein.

Some devices may include software which executes on one or more processors. The software may include, for example, an OS, a virtual machine monitor (VMM), and applications such as a verification module, a sequence mining module, etc. A device may also include storage and main memory. Software and other data may be copied from the storage into the memory. The processor may then execute the software from memory.

Alternative embodiments also include machine accessible media encoding instructions or control logic for performing the operations described herein. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an ASIC, etc.). For example, a nucleobase sequencing unit may be implemented as a combination of hardware and software.

In at least one embodiment, the instructions for all relevant components may be stored in one non-transitory machine accessible medium. In at least one other embodiment, two or more non-transitory machine accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, systems on a chip (SoCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a sequence mining platform (SMP). The SMP comprises (a) a sequence manager to use processing resources to determine a sequence of nucleobases in a nucleic acid; (b) a blockchain manager to: (i) collect transaction data for one or more transactions for a blockchain which requires a proof of work (POW) for each new block; and (ii) include at least some of the transaction data in a new block for the blockchain; and (c) a sequence mining module (SMM) to use the determined sequence of nucleobases from the sequence manager to create a POW for the new block. The SMP also comprises a processor and at least one machine-accessible storage medium responsive to the processor. The sequence manager, the blockchain manager, and the SMM may be stored in the machine-accessible storage medium.

Example A2 is an SMP according to Example A1, further comprising technology to establish a trusted execution environment (TEE) within the SMP, wherein the technology to establish the TEE comprises protected storage. The sequence manager is configured to execute in the TEE and to save the determined sequence of nucleobases in the protected storage of the TEE.

Example A3 is an SMP according to Example A1, wherein the SMM comprises the sequence manager and the blockchain manager. Example A3 may also include the features of Example A2.

Example A4 is an SMP according to Example A1, further comprising a nucleobase sequencing unit (NSU). The processing resources to be used by the sequence manager to determine the sequence of nucleobases in the nucleic acid comprise the NSU. Example A4 may also include the features of any one or more of Examples A2 through A3.

Example A5 is an SMP according to Example A4, wherein the NSU is configured to introduce at least one secret error into a determined nucleobase sequence (DNS).

Example B1 is a sequence verifying platform (SVP). The SVP comprises at least one processor and a machine-accessible storage medium responsive to the processor. The SVP also comprises a verification module in the machine-accessible storage medium. When executed by the processor, the verification module enables the SVP to (a) determine whether a first discovered nucleobase sequence (DNS) from a first sequence mining platform (SMP) and a second DNS from a second SMP include matching segments; and (b) in response to a determination that the first and second DNSs include matching segments, grant sequencing rewards to the first and second SMPs.

Example B2 is an SVP according to Example B1, wherein the verification module is configured to (a) consider proofs of work (POWs) in blocks that have been added to a blockchain by at least one of the SMPs; and (b) grant sequencing rewards based at least in part on the POWs.

Example B3 is an SVP according to Example B2, wherein the verification module is configured to enforce a predetermined corroboration threshold, wherein the corroboration threshold specifies a minimum required number of corroborating SMPs. Also, the verification module is configured to grant sequencing rewards based on a determination that (a) DNSs which include matching segments have been received from the minimum required number of corroborating SMPs and (b) blocks with POWs based on matching segments have been generated by the minimum required number of corroborating SMPs.

Example B4 is an SVP according to Example B1, wherein the verification module is configured to enforce a predetermined corroboration threshold, wherein the corroboration threshold specifies a minimum required number of corroborating SMPs. Also, the verification module, when executed by the processor, enables the SVP to (a) determine whether the corroboration threshold has been met, based on DNSs from at least the minimum required number of SMPs; and (b) in response to a determination that the corroboration threshold has been met, granting the sequencing reward to each of the SMPs in the minimum required number. Example B4 may also include the features of any one or more of Examples B2 through B3.

Example B5 is an SVP according to Example B1 wherein the verification module is configured to detect secret errors in DNSs, reject DNSs without secret errors, and grant sequencing rewards only to SMPs who provided DNSs with secret errors. Example B5 may also include the features of any one or more of Examples B2 through B4.

Example B6 is an SVP according to Example B1, wherein the verification module is configured to correct a secret error in the first DNS from the first SMP, based on at least one DNS with a different secret error from a different SMP. Example B6 may also include the features of any one or more of Examples B2 through B3.

Example C1 is a blockchain system comprising an SVP according to claim 6, and at least one sequence mining platform (SMP).

Example C2 is a blockchain system according to Example C1, wherein the SMP comprises (a) a sequence manager to use processing resources to determine a sequence of nucleobases in a nucleic acid; and (b) a blockchain manager to (i) collect transaction data for one or more transactions for a blockchain which requires a proof of work (POW) for each new block; and (ii) include at least some of the transaction data in a new block for the blockchain. The SMP also comprises a sequence mining module (SMM) to use the determined sequence of nucleobases from the sequence manager to create a POW for the new block. The SMM enables an entity which controls the SMP to receive (a) a transaction reward based on at least one transaction in the new block, as well as (b) a sequencing reward based on nucleobase sequencing work performed by the SMP.

Example D1 is an apparatus to enable a sequence mining platform to generate a proof of work based on a discovered nucleobase sequence. The apparatus comprises (a) at least one non-transitory machine-accessible storage medium; and a sequence manager in the machine-accessible storage medium, wherein the sequence manager, when executed by the sequence mining platform (SMP), enables the SMP to use processing resources of the SMP to determine a sequence of nucleobases in a nucleic acid. The apparatus also comprises a blockchain manager in the machine-accessible storage medium, wherein the blockchain manager, when executed by the SMP, enables the SMP to (a) collect transaction data for one or more transactions for a blockchain which requires a proof of work (POW) for each new block; and (b) include at least some of the transaction data in a new block for the blockchain. The apparatus also comprises a sequence mining module (SMM) in the machine-accessible storage medium, wherein the SMM, when executed by the SMP, enables the SMP to use the determined sequence of nucleobases from the sequence manager to create a POW for the new block.

Example D2 is an apparatus according to Example D1, wherein the sequence manager is configured to execute in a trusted execution environment (TEE) within the SMP and to save the determined sequence of nucleobases in protected storage of the TEE.

Example D3 is an apparatus according to Example D1, wherein the SMM comprises the sequence manager and the blockchain manager. Example D3 may also include the features of Example D2.

Example D4 is an apparatus according to Example D1, wherein the processing resources to be used by the sequence manager to determine the sequence of nucleobases in the nucleic acid comprise a nucleobase sequencing unit (NSU) of the SMP. Example D4 may also include the features of any one or more of Examples D2 through D3.

Example D5 is an apparatus according to Example D4, wherein the NSU is configured to introduce at least one secret error into a determined nucleobase sequence (DNS).

Example E1 is an apparatus to enable a sequence verifying platform to verify a discovered nucleobase sequence. The apparatus comprises at least one non-transitory machine-accessible storage medium, and a verification module in the machine-accessible storage medium. The verification module, when executed by the sequence verifying platform (SVP), enables the SVP to (a) determine whether a first discovered nucleobase sequence (DNS) from a first sequence mining platform (SMP) and a second DNS from a second SMP include matching segments; and (b) in response to a determination that the first and second DNSs include matching segments, grant sequencing rewards to the first and second SMPs.

Example E2 is an apparatus according to Example E1, wherein the verification module is configured to (a) consider proofs of work (POWs) in blocks that have been added to a blockchain by at least one of the SMPs; and (b) grant sequencing rewards based at least in part on the POWs.

Example E3 is an apparatus according to Example E1, wherein the verification module is configured to enforce a predetermined corroboration threshold, wherein the corroboration threshold specifies a minimum required number of corroborating SMPs. Also, the verification module is configured to grant sequencing rewards based on a determination that (a) DNSs which include matching segments have been received from the minimum required number of corroborating SMPs and (b) blocks with POWs based on matching segments have been generated by the minimum required number of corroborating SMPs. Example E3 may also include the features of Example E2.

Example E4 is an apparatus according to Example E1, wherein the verification module is configured to enforce a predetermined corroboration threshold, wherein the corroboration threshold specifies a minimum required number of corroborating SMPs. Also, the verification module, when executed, enables the SVP to (a) determine whether the corroboration threshold has been met, based on DNSs from at least the minimum required number of SMPs; and (b) in response to a determination that the corroboration threshold has been met, granting the sequencing reward to each of the SMPs in the minimum required number. Example E4 may also include the features of any one or more of Examples E2 through E3.

Example E5 is an apparatus according to Example E1, wherein the verification module is configured to detect secret errors in DNSs, reject DNSs without secret errors, and grant sequencing rewards only to SMPs who provided DNSs with secret errors. Example E5 may also include the features of any one or more of Examples E2 through E4.

Example E6 is an apparatus according to Example E1, wherein the verification module is configured to correct a secret error in the first DNS from the first SMP, based on at least one DNS with a different secret error from a different SMP. Example E6 may also include the features of any one or more of Examples E2 through E5.

Example F1 is a method for generating a proof of work based on a discovered nucleobase sequence. The method comprises (a) using processing resources of the data processing system to determine a sequence of nucleobases in a nucleic acid; (b) collecting transaction data for one or more transactions for a blockchain which requires a proof of work (POW) for each new block; (c) including at least some of the transaction data in a new block for the blockchain; and (d) using the determined sequence of nucleobases to create a POW for the new block.

Example F2 is a method according to Example F1, wherein the operation of using processing resources to determine the sequence of nucleobases is performed at least in part by a sequence manager that executes in a trusted execution environment (TEE) within the data processing system.

Example F3 is a method according to Example F1, wherein the processing resources to be used to determine the sequence of nucleobases in the nucleic acid comprise a nucleobase sequencing unit (NSU) of the data processing system. Example F3 may also include the features of Example F2.

Example F4 is a method according to Example F3, wherein the NSU is configured to introduce at least one secret error into a determined nucleobase sequence (DNS).

Example G1 is a method for verifying a discovered nucleobase sequence. The method comprises (a) determining whether a first discovered nucleobase sequence (DNS) from a first sequence mining platform (SMP) and a second DNS from a second SMP include matching segments; and (b) in response to a determination that the first and second DNSs include matching segments, granting sequencing rewards to the first and second SMPs.

Example G2 is a method according to Example G1, further comprising (a) considering proofs of work (POWs) in blocks that have been added to a blockchain by at least one of the SMPs; and (b) granting sequencing rewards based at least in part on the POWs.

Example G3 is a method according to Example G2, further comprising (a) using a predetermined corroboration threshold, wherein the corroboration threshold specifies a minimum required number of corroborating SMPs; and (b) granting sequencing rewards based on a determination that (a) DNS s which include matching segments have been received from the minimum required number of corroborating SMPs and (b) blocks with POWs based on matching segments have been generated by the minimum required number of corroborating SMPs.

Example G4 is a method according to Example G1, further comprising (a) determining whether a corroboration threshold has been met, based on DNSs from at least a minimum required number of SMPs, wherein the corroboration threshold specifies the minimum required number of corroborating SMPs; and (b) in response to a determination that the corroboration threshold has been met, granting the sequencing reward to each of the SMPs in the minimum required number. Example G4 may also include the features of any one or more of Examples G2 through G3.

Example G5 is a method according to Example G1, further comprising detecting secret errors in DNSs, rejecting DNSs without secret errors, and granting sequencing rewards only to SMPs who provided DNSs with secret errors. Example G5 may also include the features of any one or more of Examples G2 through G4.

Example G6 is a method according to Example G1, further comprising correcting a secret error in the first DNS from the first SMP, based on at least one DNS with a different secret error from a different SMP. Example G6 may also include the features of any one or more of Examples G2 through G5.

Example H is at least one machine-accessible medium comprising computer instructions for using discovered nucleobase sequences with blockchain mining. The computer instructions, in response to being executed by a data processing system, enable the data processing system to perform a method according to any of Examples F1 through F4 and G1 through G5.

Example I is a data processing system with technology for using discovered nucleobase sequences with blockchain mining. The data processing system comprises (a) a processing element; (b) at least one machine-accessible medium responsive to the processing element; and (c) computer instructions stored at least partially in the at least one machine-accessible medium. The computer instructions, in response to being executed, enable the data processing system to perform a method according to any of Examples F1 through F4 and G1 through G5.

Example J is a data processing system with technology for using discovered nucleobase sequences with blockchain mining. The data processing system comprises means for performing the method of any one of Examples F1 through F4 and G1 through G5.

What is claimed is:

1. A sequence verifying platform (SVP) comprising:
   at least one hardware processor;
   a machine-accessible storage medium responsive to the processor; and
   a verification module in the machine-accessible storage medium, wherein the verification module, when executed by the processor, enables the SVP to:
      determine whether a first discovered nucleobase sequence (DNS) from a first sequence mining platform (SMP) and a second DNS from a second SMP include matching segments;
      in response to a determination that the first and second DNSs include matching segments, grant sequencing rewards to the first and second SMPs;
      enforce a predetermined corroboration threshold, wherein the corroboration threshold specifies a minimum required number of corroborating SMPs; and
      grant sequencing rewards based on a determination that (a) DNSs which include matching segments have been received from the minimum required number of corroborating SMPs and (b) blocks with POWs based on matching segments have been generated by the minimum required number of corroborating SMPs.

2. An SVP according to claim 1, wherein the verification module is configured to:
   consider proofs of work (POWs) in blocks that have been added to a blockchain by at least one of the SMPs; and
   grant sequencing rewards based at least in part on the POWs.

3. An SVP according to claim 1, wherein:
   the verification module is configured to enforce a predetermined corroboration threshold, wherein the corroboration threshold specifies a minimum required number of corroborating SMPs; and
   the verification module, when executed by the processor, enables the SVP to:
      determine whether the corroboration threshold has been met, based on DNSs from at least the minimum required number of SMPs; and
      in response to a determination that the corroboration threshold has been met, grant the sequencing reward to each of the SMPs included in the minimum required number of corroborating SMPs.

4. An SVP according to claim 1, wherein the verification module is configured to:
   detect secret errors in DNSs;
   reject DNSs without secret errors; and
   grant sequencing rewards only to SMPs who provided DNSs with secret errors.

5. An SVP according to claim 1, wherein the verification module is configured to correct a secret error in the first DNS from the first SMP, based on at least one DNS with a different secret error from a different SMP.

6. A blockchain system comprising:
   a first sequence mining platform (SMP); and
   a sequence verifying platform (SVP) comprising:
      at least one hardware processor;
      a machine-accessible storage medium responsive to the processor; and
      a verification module in the machine-accessible storage medium, wherein the verification module, when executed by the processor, enables the SVP to:
         determine whether a first discovered nucleobase sequence (DNS) from the first sequence mining platform (SMP) and a second DNS from a second SMP include matching segments;
         in response to a determination that the first and second DNSs include matching segments, grant sequencing rewards to the first and second SMPs;
         enforce a predetermined corroboration threshold, wherein the corroboration threshold specifies a minimum required number of corroborating SMPs; and
         grant sequencing rewards based on a determination that (a) DNSs which include matching segments have been received from the minimum required number of corroborating SMPs and (b) blocks with POWs based on matching segments have been generated by the minimum required number of corroborating SMPs.

7. A blockchain system according to claim 6, wherein: the first SMP comprises:
- a sequence manager to use processing resources to determine a sequence of nucleobases in a nucleic acid;
- a blockchain manager to:
  - collect transaction data for one or more transactions for a blockchain which requires a proof of work (POW) for each new block; and
  - include at least some of the transaction data in a new block for the blockchain; and
- a sequence mining module (SMM) to use the determined sequence of nucleobases from the sequence manager to create a POW for the new block; and
- the SMM enables an entity which controls the first SMP to receive (a) a transaction reward based on at least one transaction in the new block, as well as (b) a sequencing reward based on nucleobase sequencing work performed by the first SMP.

8. An apparatus to enable a sequence verifying platform to verify a discovered nucleobase sequence, the apparatus comprising:
- at least one non-transitory machine-accessible storage medium; and
- a verification module in the machine-accessible storage medium, wherein the verification module, when executed by the sequence verifying platform (SVP), enables the SVP to:
  - determine whether a first discovered nucleobase sequence (DNS) from a first sequence mining platform (SMP) and a second DNS from a second SMP include matching segments;
  - in response to a determination that the first and second DNSs include matching segments, grant sequencing rewards to the first and second SMPs;
  - enforce a predetermined corroboration threshold, wherein the corroboration threshold specifies a minimum required number of corroborating SMPs; and
  - grant sequencing rewards based on a determination that (a) DNSs which include matching segments have been received from the minimum required number of corroborating SMPs and (b) blocks with POWs based on matching segments have been generated by the minimum required number of corroborating SMPs.

9. An apparatus according to claim 8, wherein the verification module is configured to:
- consider proofs of work (POWs) in blocks that have been added to a blockchain by at least one of the SMPs; and
- grant sequencing rewards based at least in part on the POWs.

10. An apparatus according to claim 8, wherein:
- the verification module is configured to enforce a predetermined corroboration threshold, wherein the corroboration threshold specifies a minimum required number of corroborating SMPs; and
- the verification module, when executed, enables the SVP to:
  - determine whether the corroboration threshold has been met, based on DNSs from at least the minimum required number of SMPs; and
  - in response to a determination that the corroboration threshold has been met, grant the sequencing reward to each of the SMPs included in the minimum required number of corroborating SMPs.

11. An apparatus according to claim 8, wherein the verification module is configured to:
- detect secret errors in DNSs;
- reject DNSs without secret errors; and
- grant sequencing rewards only to SMPs who provided DNSs with secret errors.

12. An apparatus according to claim 8, wherein the verification module is configured to correct a secret error in the first DNS from the first SMP, based on at least one DNS with a different secret error from a different SMP.

* * * * *